United States Patent
Tomita et al.

(10) Patent No.: US 10,374,517 B2
(45) Date of Patent: Aug. 6, 2019

(54) APPARATUS FOR CONTROLLING POWER CONVERTER

(71) Applicants: SOKEN, INC., Nisshin, Aichi-pref. (JP); DENSO CORPORATION, Kariya, Aichi-pref. (JP)

(72) Inventors: Kenji Tomita, Nisshin (JP); Seiji Iyasu, Nisshin (JP); Yuichi Handa, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/185,176

(22) Filed: Nov. 9, 2018

(65) Prior Publication Data

US 2019/0149055 A1 May 16, 2019

(30) Foreign Application Priority Data

Nov. 10, 2017 (JP) ................................ 2017-217138

(51) Int. Cl.
*H02M 3/335* (2006.01)
*H02M 3/337* (2006.01)

(52) U.S. Cl.
CPC ....... *H02M 3/33569* (2013.01); *H02M 3/337* (2013.01)

(58) Field of Classification Search
CPC .......................... H02M 3/33569; H02M 3/337
See application file for complete search history.

(56) References Cited

U.S. PATENT DOCUMENTS

| 2009/0230903 | A1* | 9/2009 | Yamamoto | H02M 7/53875 318/400.3 |
| 2010/0045102 | A1* | 2/2010 | Kitanaka | H02M 3/1582 307/9.1 |
| 2015/0028691 | A1* | 1/2015 | Yamauchi | H02J 7/025 307/104 |
| 2015/0280591 | A1* | 10/2015 | Handa | H02M 1/4225 363/21.04 |
| 2016/0204648 | A1 | 7/2016 | Kawamura et al. | |

(Continued)

FOREIGN PATENT DOCUMENTS

JP 2011-091946 A 5/2011
JP 2012-085378 A 4/2012
(Continued)

*Primary Examiner* — Fred E Finch, III
*Assistant Examiner* — Rafael O. De León Domenech
(74) *Attorney, Agent, or Firm* — Oliff PLC

(57) ABSTRACT

An apparatus for controlling a power converter includes a first converter configured to convert an AC voltage into a DC voltage by operations of an input side switch, a DC link capacitor charged with the DC voltage from the first converter, and a second converter configured to step down the DC voltage across the DC link capacitor by operations of one or more output side switches. In the apparatus, a lower limit calculator calculates a lower limit of the DC voltage across the DC link capacitor based on an output voltage of the second converter, a turns ratio of a transformer of the second converter, and a ratio of a turn-on period to one switching period for the one or more output side switches. A switch controller operates the input side switch to control the voltage across the DC link capacitor to a command voltage higher than the lower limit.

7 Claims, 10 Drawing Sheets

(56) References Cited

U.S. PATENT DOCUMENTS

| | | | |
|---|---|---|---|
| 2016/0226427 A1* | 8/2016 | Sakai | H02P 27/08 |
| 2016/0303987 A1 | 10/2016 | Kawamura et al. | |
| 2017/0155325 A1* | 6/2017 | Shimada | H02J 50/12 |
| 2017/0201184 A1* | 7/2017 | Yonezawa | H02M 1/32 |
| 2017/0358987 A1 | 12/2017 | Oouchi et al. | |
| 2018/0166903 A1 | 6/2018 | Sato et al. | |

FOREIGN PATENT DOCUMENTS

| | | |
|---|---|---|
| JP | 2013-013248 A | 1/2013 |
| JP | 2013-247817 A | 12/2013 |
| JP | 2015-149822 A | 8/2015 |

* cited by examiner

COMPARATIVE EXAMPLE

FOURTH EMBODIMENT

APPARATUS FOR CONTROLLING POWER CONVERTER

CROSS-REFERENCE TO RELATED APPLICATION

This application is based on and claims the benefit of priority from earlier Japanese Patent Application No. 2017-217138 filed on Nov. 10, 2017, the description of which is incorporated herein by reference.

BACKGROUND

Technical Field

The present disclosure relates to an apparatus for controlling a power converter.

Related Art

A power converter disclosed in JP-A-2012-85378 includes an AC-DC converter, a DC link capacitor electrically connected between output terminals of the AC-DC converter, an isolated DC-DC converter electrically connected across the DC link capacitor. In the power converter, the DC link capacitor is charged with DC voltage supplied from the AC-DC converter. The DC-DC converter steps down the link voltage across the DC link capacitor to supply power to an object to be powered.

In the power converter of JP-A-2012-85378, a primary winding of a transformer included in the DC-DC converter is provided with an LC resonant circuit. In such a configuration, the impedance of the primary winding is reduced at or near the resonance frequency of the LC resonant circuit, which facilitates electrical current flow through a secondary circuit electrically connected to a secondary winding of the transformer.

According to the findings by the inventors of the present application, replacement of the DC-DC converter having the LC resonant circuit with the DC-DC converter having no such LC resonant circuit may not provide stable supply of output current from the DC-DC converter to the object to be powered.

In view of the above, it is desired to have an apparatus for controlling a power converter provided with a DC link capacitor, which enables stably supplying output current from the power converter to an object to be powered.

SUMMARY

One aspect of the disclosure provides an apparatus for controlling a power converter. The power converter includes: a first converter configured to convert an AC voltage supplied from an alternating current (AC) power source into a direct-current (DC) voltage by operations of an input side switch; a DC link capacitor configured to be charged with the DC voltage supplied from the first converter; a second converter comprising a primary side circuit including one or more output side switches, a secondary side circuit electrically connected to an object to be powered, and a transformer isolating the primary side circuit and the secondary side circuit from each other, the second converter being configured to step down the DC voltage supplied from the DC link capacitor by operations of the one or more output side switches and supply the stepped down voltage to the object to be powered; and a voltage detector configured to detect an output voltage of the second converter. The apparatus includes: a lower limit calculator configured to calculate a lower limit of a voltage across the DC link capacitor based on an output voltage detected by the voltage detector, a turns ratio of the transformer, and a ratio of a turn-on period to one switching period for the one or more output side switches; and a switch controller configured to operate the input side switch to control a link voltage that is a voltage across the DC link capacitor to a command voltage higher than the lower limit.

In the above aspect, the power converter includes the first converter that converts the AC voltage supplied from the AC power source to the DC voltage, the DC link capacitor that is charged with the DC voltage supplied from the first converter, and the second converter that steps down the DC voltage supplied form the DC link capacitor by switching on and off of the one or more output side switches in the primary side circuit and supply power to the object to be powered.

Regarding such a power converter, the inventors of the present application have found that unstable supply of output current from the second converter to the object to be powered may be caused by improper voltages across the DC link capacitor disposed between the first converter and the second converter. More specifically, since a low voltage across the DC link capacitor may lead to a low input voltage of the second converter, the object to be powered that is electrically connected to the secondary side circuit may not be supplied with sufficient power. To solve such deficiency, the lower limit of the voltage across the DC link capacitor is calculated based on the output voltage of the second converter, the turns ratio of the transformer, and the maximum ratio of the turn-on period to one switching period for the one or more output side switches. The input side switch is operated to control the link voltage that is a voltage across the DC link capacitor to a higher value than the calculated lower limit. With this configuration, the output voltage supplied from the second converter to the object to be powered can be controlled to an appropriate application voltage for the object to be powered, which can stably provide an output current from the second converter to the object to be powered.

DESCRIPTION OF SPECIFIC EMBODIMENTS

Figure 1:
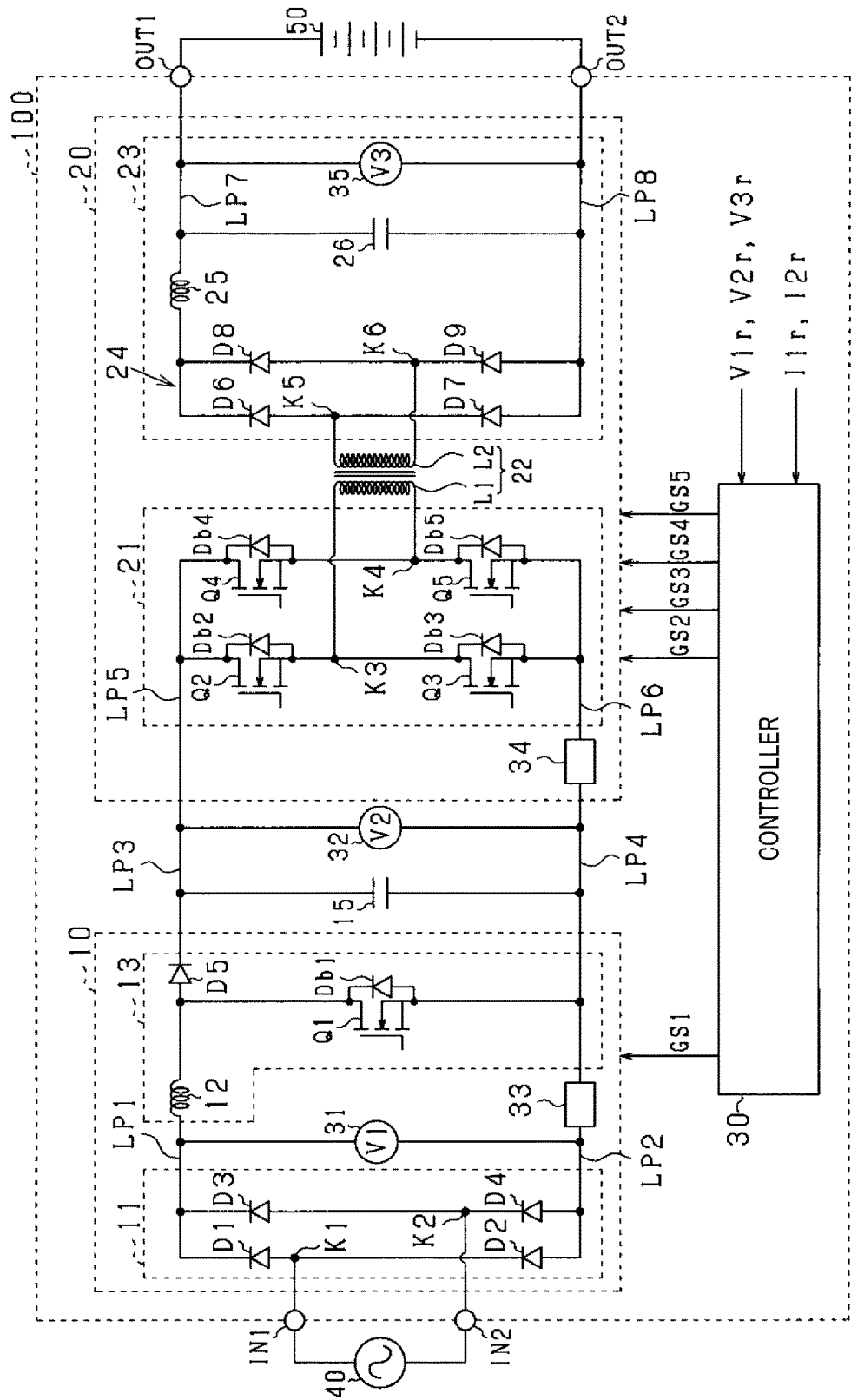
FIG. 1 is a block diagram of a battery charger in accordance with a first embodiment of the present disclosure.

Hereinafter, exemplary embodiments of the present disclosure will be described in detail with reference to the accompanying drawings, in which like reference numerals refer to like or similar elements and duplicated description thereof will be omitted.

First Embodiment

In the present embodiment, a battery charger will now be described as an example of application of the power converter. The battery charger is used to charge a rechargeable battery with alternating-current (AC) power supplied from an AC power source.

FIG. 1 is a block diagram of the battery charger 100 of the present embodiment. A first input terminal IN1 of the battery charger 100 is electrically connected to a first terminal of an AC power source 40, and a second input terminal IN2 is electrically electrically connected to a second terminal of the AC power source 40. A first output terminal OUT1 of the battery charger 100 is electrically connected to rechargeable battery 50 positive terminal of a rechargeable battery 50 as an object to be powered, and a second output terminal OUT2 of the battery charger 100 is electrically connected to a negative terminal of the rechargeable battery 50. The rechargeable battery 50 of the present embodiment may be an assembled battery formed of a series connection of a plurality of battery cells.

In the present embodiment, an input voltage supplied from the AC power source 40 has a positive polarity when a voltage on the first terminal of the AC power source 40 is higher than a voltage on the second terminal of the AC power source 40. The input voltage supplied from the AC power source 40 has a negative polarity when a voltage on the second terminal of the AC power source 40 is higher than the voltage on the first terminal of the AC power source 40.

The battery charger 100 includes an AC-DC converter 10, a DC link capacitor 15, and a DC-DC converter 20. The AC-DC converter 10 converts an AC voltage supplied from the AC power source 40 into a DC voltage to supply it to the DC link capacitor 15. The DC-DC converter 20 steps down the link voltage supplied from the DC link capacitor 15 to supply the stepped down voltage to the rechargeable battery 50. In the present embodiment, the AC-DC converter 10 corresponds to a first converter and the DC-DC converter 20 corresponds to a second converter.

The AC-DC converter 10 includes a diode bridge circuit 11 and a boost chopper circuit 13. In the battery charger 100 of the present embodiment, a high side wiring of the AC-DC converter 10, to which a high side voltage is applied, is referred to as a first wiring LP1, and a low side wiring of the AC-DC converter 10, to which a low side voltage is applied, is referred to as a second wiring LP2.

The diode bridge circuit 11 includes a first diode D1, a second diode D2, a third diode D3, and a fourth diode D4. The anode of the first diode D1 is electrically connected to the cathode of the second diode D2, and the anode of the third diode D3 is electrically connected to the cathode of the fourth diode D4. The cathode of each of the first diode D1 and the third diode D3 are electrically connected to the first wiring LP1, and the anode of each of the second diode D2 and the fourth diode D4 is electrically connected to the second wiring LP2.

A first connection point K1 that is a connection point between the first diode D1 and the second diode D2 is electrically connected to the first input terminal IN1. A second connection point K2 that is a connection point between the third diode D3 and the fourth diode D4 is electrically connected to the second input terminal IN2.

The boost chopper circuit 13 includes a first reactor 12, a first drive switch Q1, and a fifth diode D5. On the first wiring LP1, a first end of the first reactor 12 is electrically connected to the diode bridge circuit 11 and a second end of the first reactor 12 is electrically connected to the anode of the fifth diode D5. On the first wiring LP1, the cathode of the fifth diode D5 is electrically connected to the DC link capacitor 15. In the present embodiment, the first drive switch Q1 is an n-channel MOSFET. Between the first reactor 12 and the fifth diode D5, the drain of the first drive switch Q1 is electrically connected to the first wiring LP1 and the source of the first drive switch Q1 is electrically connected to the second wiring LP2. The first drive switch Q1 includes a body diode Db1. In the present embodiment, the first drive switch Q1 corresponds to an input side switch.

The DC link capacitor 15 is electrically connected between a high-side, third wiring LP3 and a low-side, fourth wiring LP4 connecting the AC-DC converter 10 and the DC-DC converter 20.

The DC-DC converter 20 includes a primary side circuit 21, a secondary side circuit 23, and a transformer 22 connecting the primary side circuit 21 and the secondary side circuit 23. In the battery charger 100 of the present embodiment, a high side wiring of the primary side circuit 21 is referred to as a fifth wiring LP5. A low side wiring of the primary side circuit 21 is referred to as a sixth wiring LP6. A high side wiring of the secondary side circuit 23 is referred to as a seventh wiring LP7. A low side wiring of the secondary side circuit 23 is referred to as an eighth wiring LP8.

The primary side circuit 21 is a full-bridge circuit formed of a second drive switch Q2, a third drive switch Q3, a fourth drive switch Q4, and a fifth drive switch Q5. In the present embodiment, the second to fifth drive switches Q1-Q5 are n-channel MOSFETs. The source of the second drive switch Q2 is electrically connected to the drain of the third drive switch Q3, thereby forming a first series connection of the second drive switch Q2 and the third drive switch Q3. The source of the fourth drive switch Q4 is electrically connected to the drain of the fifth drive switch Q5, thereby forming a second series connection of the fourth drive switch Q4 and the fifth drive switch Q5. The drain of each of the second drive switch Q2 and the fourth drive switch Q4 is electrically connected to the third wiring LP3. The source of each of the third drive switch Q3 and the fifth drive switch Q5 is electrically connected to the fourth wiring LP4. In the present embodiment, the second to fifth drive switches Q2-Q5 correspond to output side switches.

On the primary side winding L1, a third connection point K3 that is a connection point between the source of the second drive switch Q2 and the drain of the third drive switch Q3 is electrically connected to a first end of the transformer 22, and a fourth connection point K4 that is a connection point between the source of the fourth drive switch Q4 and the drain of the fifth drive switch Q5 is electrically connected to a second end of the transformer 22. The second to fifth drive switches Q2 to Q5 include body diodes Db2 to Db5, respectively.

The secondary side circuit 23 includes a diode bridge circuit 24 formed of a sixth diode D6, a seventh diode D7, an eighth diode D8, and a ninth diode D9. In the diode bridge circuit 24, the anode of the sixth diode D6 is electrically connected to the cathode of the seventh diode D7, and the anode of the eighth diode D8 is electrically connected to the cathode of the ninth diode D9. The cathode of each of the sixth diode D6 and the eighth diode D8 is electrically connected to the seventh wiring LP7. The anode of each of seventh diode D7 and the ninth diode D9 is electrically connected to the eighth wiring LP8.

A fifth connection point K5 that is a connection point between the anode of the sixth diode D6 and the cathode of the seventh diode D7 is electrically connected to a first end of the secondary side winding L2 of the transformer 22. A sixth connection point K6 that is a connection point between the anode of the eighth diode D8 and the cathode of the ninth diode D9 is electrically connected to a second end of the secondary side winding L2 of the transformer 22.

A second smoothing capacitor 26 is electrically connected between the seventh wiring LP7 and the eighth wiring LP8. A second reactor 25 is electrically connected between a connection point of the diode bridge circuit 24 to the seventh wiring LP7 and a connection point of the second smoothing capacitor 26 to the seventh wiring LP7. The seventh wiring LP7 is electrically connected to the first output terminal OUT1, and the eighth wiring LP8 is electrically connected to the second output terminal OUT2.

The battery charger 100 includes a first voltage detector 31, a second voltage detector 32, a first current sensor 33, a second current sensor 34, and a third voltage detector 35.

A first end of the first voltage detector 31 is electrically connected to part of the first wiring LP1 between the diode bridge circuit 11 and the first reactor 12. A second end of the first voltage detector 31 is electrically connected to part of the second wiring LP2 between the diode bridge circuit 11 and a connection point of the source of the first drive switch Q1 to the second wiring LP2. The first voltage detector 31 is configured to detect a DC voltage output from the diode bridge circuit 11 that is a full wave rectified version of the AC voltage, as a first voltage V1r.

The second voltage detector 32 is electrically connected in parallel with the DC link capacitor 15. More specifically, the second voltage detector 32, between the DC link capacitor 15 and the DC-DC converter 20, is electrically connected between the third wiring LP3 and the fourth wiring LP4. The second voltage detector 32 detects a voltage across the DC link capacitor 15 as a link voltage V2r.

The first current sensor 33 is electrically connected between a connection point of the diode bridge circuit 11 to the second wiring LP2 and a connection point of the boost chopper circuit 13 to the second wiring LP2, such that the first current sensor 33 detects a current through the first reactor 12 or the first drive switch Q1 as a first current I1r.

The second current sensor 34, between the DC link capacitor 15 and the primary side circuit 21, is electrically connected to the sixth wiring LP6 of the DC-DC converter 20, such that the second current sensor 34 detects a current through the primary side circuit 21 as a second current I2r. More specifically, the second current sensor 34 detects a current through the primary side winding L1 as a second current I2r. Therefore, the second current I2r multiplied by a turns ratio Nr of the transformer 22 yields a current through the second reactor 25 of the secondary side circuit 23. In the present embodiment, the turns ratio Nr of the transformer 22 is calculated as a ratio of a number of turns N1 of the primary side winding L1 to a number of turns N2 of the secondary side winding L2 (i.e., Nr=N1/N2).

The third voltage detector 35, in parallel with the second smoothing capacitor 26, is electrically connected between the seventh wiring LP7 and the eighth wiring LP8. More specifically, the third voltage detector 35 is electrically connected in parallel with the second smoothing capacitor 26. With this configuration, the third voltage detector 35 detects a voltage across the second smoothing capacitor 26 as an output voltage V3r.

The battery charger 100 includes a controller 30. The controller 30 is configured as a well-known microcomputer including a central processing unit (CPU), a read-only memory (ROM), a random access memory (RAM), an input/output (I/O) interface, a storage device and others. The controller 30 generates operation or drive signals for turning on and off the first to fifth drive switches Q1-Q5. In the present embodiment, the controller 30 generates a first operation signal GS1 for operating the first drive switch Q1 to control the link voltage V2r to a second command voltage V2*. More specifically, the controller 30 calculates a first command current I1* as a control variable used to feedback control the link voltage V2r to the second command voltage V2*. The controller 30 then generates the first operation signal GS1 for operating the first drive switch Q1 to feedback control the first command current I1 to the calculated first command current I1*.

The controller 30 generates second to fifth operation signals GS2-GS5 for operating the second to fifth drive switches Q2-Q5 to control an output voltage V3r to a third command voltage V3*. More specifically, the controller 30 calculates a second command current I2* as a control variable used to feedback control the output voltage V3r to the third command voltage V3*. The controller 30 then generates second to fifth operation signals GS2-GS5 to feedback control the second current I2r to the calculated second command current I2*.

Various functions of the controller 30 can be implemented by software stored in a tangible memory device and a computer that executes it, hardware, or a combination thereof.

Operations of the AC-DC converter 10 will now be described. The AC-DC converter 10 is controlled by the first operation signals GS1 received from the controller 30 to alternate between a first state where magnetic energy is stored in the first reactor 12 and a second state where current flows out of the first reactor 12.

In the first state, the first operation signal GS1 is in a high state. The first drive switch Q1 is then turned on, resulting in formation of a closed circuit including the diode bridge circuit 11, the first reactor 12, first drive switch Q1. As current flows through the closed circuit, the first reactor 12 is charged with magnetic energy.

In the second state subsequent to the first state, the first operation signal GS1 is in a low state, the first drive switch Q1 is then turned off. As current flows through the first reactor 12 and the fifth diode D5, the DC link capacitor 15 is charged.

Operations of the DC-DC converter 20 will now be described. The DC-DC converter 20 is controlled by second to fifth operation signals GS2-GS5 received from the controller 30 to alternate between a third state where current of positive polarity flows through the primary side winding L1 of the transformer 22 and a fourth state where current of negative polarity flows through the primary side winding L1 of the transformer 22. In the third and fourth states, the DC-DC converter 20 is supplied with a link voltage V2r as an input voltage. In the present embodiment, the current of positive polarity refers to current flowing through the primary side winding L1 in a direction from the third connection point K3 to the fourth connection point K4. The current of negative polarity refers to current flowing through the primary side winding L1 in a direction from the fourth connection point K4 to the third connection point K3.

In the third state, the second and fifth operation signals GS2, GS5 are in a high state and the third and fourth operation signals GS3, GS4 are in a low state, which results in current of positive polarity flowing through the primary side winding L1 and thus induces current flowing through the secondary side winding L2 in a direction from the sixth connection point K6 to the fifth connection point K5. The current that has flowed out of the secondary side winding L2 is rectified by the diode bridge circuit 24 and then flows to the first output terminal OUT1 through the second reactor 25.

In the fourth state, the third and fourth operation signals GS3, GS4 are in a high state and the second and fifth operation signals GS2, GS5 are a low state, which results in current of negative polarity flowing through the primary side winding L1 and thus induces current flowing through the secondary side winding L2 in a direction from the fifth connection point K5 to the sixth connection point K6. The current that has flowed out of the secondary side winding L2 is rectified by the diode bridge circuit 24 and then flows to the first output terminal OUT1 through the second reactor 25.

Preferably, in the battery charger 100, the link voltage V2r applied to the DC-DC converter 20 is controlled to a low value in order to reduce switching losses of the second to fifth drive switches Q2-Q5. However, a too low link voltage V2r may generate the following issues. More specifically, in such a case, a voltage across the second reactor 25 included in the secondary side circuit 23 of the DC-DC converter 20 becomes low, which may lead to a small current flowing through the second reactor 25 to the rechargeable battery 50. In addition, a voltage on the positive terminal of the rechargeable battery 50 may become higher than a voltage supplied from secondary side winding L2 to the second reactor 25, which may disable the battery charger 100 to supply current to the rechargeable battery 50. Where there are these issues, the battery charger 100 may be unable to supply output current to the rechargeable battery 50 and may thus be unable to properly charge the rechargeable battery 50.

In the present embodiment, the link voltage V2r is set within an appropriate voltage range to reduce the switching losses and properly supply output current to the rechargeable battery 50. More specifically, the controller 30 calculates a lower limit threshold for the link voltage V2r using the output voltage V3r of the DC-DC converter 20, the turns ratio Nr, and the duty ratio that is a ration of a turn-on period to one switching period. The first drive switch Q1 of the AC-DC converter 10 is operated such that the link voltage V2r is above the lower limit threshold.

Figure 2A:
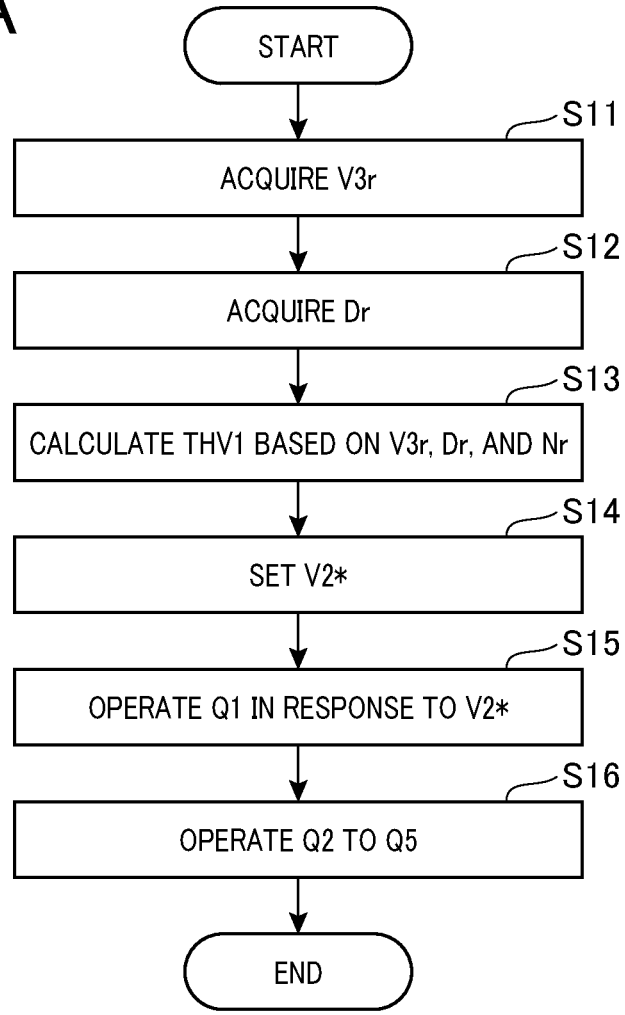
FIG. 2A is a flowchart of processing for controlling a link voltage V$2r$ in accordance with the first embodiment.

Processing performed by the controller 30 to control the link voltage V2r will now be described with reference to FIG. 2A. This processing shown in FIG. 2A is performed iteratively by the controller 30 every predetermined time interval.

At step S11, the controller 30 acquires the output voltage V3r of the DC-DC converter 20.

At step S12, the controller 30 acquires a maximum duty ratio Dr of the turn-on period Ton in the DC-DC converter 20. In the present embodiment, the duty ratio is a ratio of the turn-on period Ton to one switching period Tsw1 for each of the drive switches Q2-Q5 (i.e., duty ratio=Ton/Tsw1). The maximum duty ratio Dr is a maximum value of the duty ratio.

At step S13, the controller 30 calculates a first lower limit threshold THV1 based on the output voltage V3r acquired at step S11, the maximum duty ratio Dr acquired at step S12, and the turns ratio Nr of the transformer 22. In the present embodiment, the first lower limit threshold THV1 is calculated based on the following expression (1).

Figure 2B:
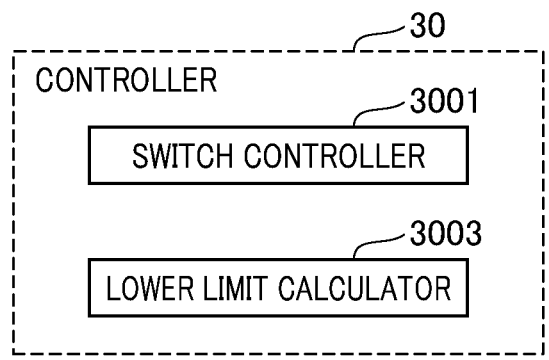
FIG. 2B is a functional block diagram of a controller of the battery charger in accordance with the first embodiment.

FIG. 2B is a functional block diagram of the controller 30 of the present embodiment. In the present embodiment, as shown in FIG. 2B, the controller 30 includes, as functional blocks, a switch controller 3001 and a lower limit calculator 3003. The switch controller 3001 is responsible for execution of step S15 described below. The lower limit calculator 3003 is responsible for execution of step S13. Functions of these blocks may be implemented by the CPU executing computer programs stored in ROM or loaded to RAM, or may be realized not only in software, but also in hardware, for example, in logic circuitry, analog circuitry, or combinations thereof.

$$THV1=(V3r/Dr) \times Nr \qquad (1)$$

At step S14, the controller 30 sets the second command voltage V2* to the AC-DC converter 10 to a higher value than the first lower limit threshold THV1 calculated at step S13. For example, the controller 30 sets the first lower limit threshold THV1 plus a value which accounts for a margin voltage $\Delta V$, as the second command voltage V2* for the link voltage V2r.

At step S15, the controller 30 operates the first drive switch Q1 of the AC-DC converter 10 to control the link voltage V2r to the second command voltage V2*. More specifically, the controller 30 sets the first operation signal GS1 to define a ratio of the turn-on period to one switching period in response to the second command voltage V2*set at step S14. In the present embodiment, the controller 30 operates the first drive switch Q1 using the first operation signal GS1 set as above.

At step S16, the controller 30 operates the second to fifth drive switches Q2-Q5 of the DC-DC converter 20 to control the output voltage V3r to the third command voltage V3*. More specifically, the controller 30 sets a ratio of the turn-on period to one switching period for the second to fifth operation signals GS2-GS5 in response to the third command voltage V3*set at step S16. The controller 30 operates the second to fifth drive switches Q2-Q5 using the second to fifth operation signals GS2-GS5.

After execution of step S16, the process flow of FIG. 2A ends. The present embodiment described above can provide the following advantage.

(A1) The controller 30 calculates the first lower limit threshold THV1 based on the output voltage V3r of the DC-DC converter 20, the turns ratio Nr of the transformer 22, and the maximum duty ratio Dr for the turn-on period Ton, and then operates the first drive switch Q1 of the AC-DC converter 10 to control the link voltage V2r to a higher value than the first lower limit threshold THV1. This configuration, in the DC-DC converter 20, can prevent a voltage applied from the secondary side winding L2 to the secondary side circuit 23 from becoming low, which enables stably providing a proper output current to the rechargeable battery 50.

Second Embodiment

A second embodiment will now be described. Only differences of the second embodiment from the first embodiment will be described and description about the common configuration between the first and second embodiments is not provided in order to avoid repetition.

Even if the second command voltage V2* is set in response to the first lower limit threshold THV1, a ripple voltage at the DC link capacitor 15 may cause the actual link voltage V2r to be lower than the second command voltage V2*. When the link voltage V2r drops below the first lower limit threshold THV1, no output current may flow to the rechargeable battery 50. In the second embodiment, the second command voltage V2* is set to a value that takes into account the ripple voltage.

Figure 3A:
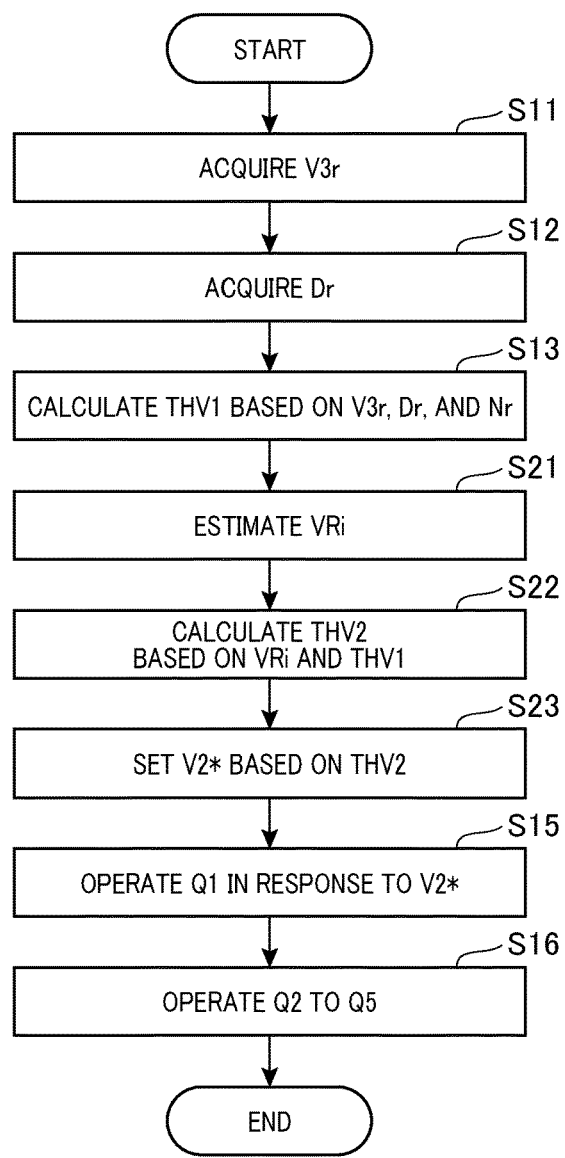
FIG. 3A is a flowchart of processing for controlling a link voltage V$2r$ in accordance with a second embodiment of the present disclosure.

FIG. 3A is a flowchart of processing performed by the controller 30 to control the link voltage V2r. This processing is iteratively performed by the controller 30 every predetermined time interval.

After calculating the first lower limit threshold THV1 at step S13, the process flow proceeds to step S21. At step S21, the controller 30 estimates the ripple voltage VRi at the DC link capacitor 15. In the present embodiment, the controller 30 estimates the ripple voltage VRi using the predicted value of the input power from the AC-DC converter 10 to the DC link capacitor 15 and the electrostatic capacitance C of the DC link capacitor 15. More specifically, the ripple voltage VRi is estimated based on the following expression (2).

$$VRi = EPin^*/(2\pi f \times V2ave \times C) \quad (2)$$

Here, EPin* represents the predicted value of the input power from the AC-DC converter 10 to the DC-DC converter 20, which is calculated based on the following expression (3).

$$EPin^* = I1^* \times V1^* \quad (3)$$

In the expression (2), f represents a switching frequency of the first drive switch Q1, V2ave represents an average of the link voltage V2r over one switching period Tsw2 (=1/f) of the first drive switch Q1. In the present embodiment, the electrostatic capacitance C of the DC link capacitor 15 is a fixed value. The switching period Tsw2 of the first drive switch Q1 and the switching period Tsw1 of the second-fifth drive switches Q2-Q5 may be equal to or different from each other.

Figure 3B:
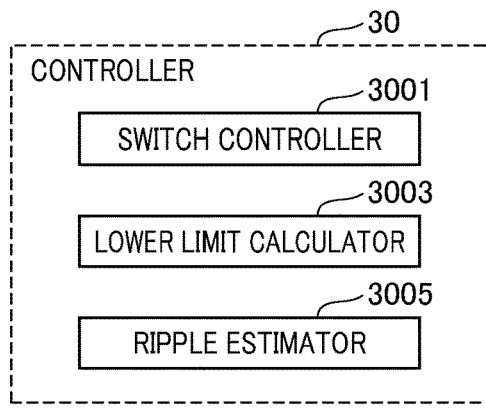
FIG. 3B is a functional block diagram of the controller of the battery charger in accordance with the second embodiment.

FIG. 3B is a functional block diagram of the controller 30 of the present embodiment. In the present embodiment, as shown in FIG. 3B, the controller 30 further includes a ripple estimator 3005 as compared to the controller shown in FIG. 2B. The ripple estimator 3005 is responsible for execution of step S21.

At step S22, the controller 30 corrects the first lower limit threshold THV1 calculated at step S13 using the ripple voltage VRi estimated at step S21 to calculate a lower limit threshold THV2. More specifically, a sum of the first lower limit threshold THV1 and the ripple voltage VRi is calculated as the second lower limit threshold THV2.

At step S23, the controller 30 sets the second command voltage V2* to a higher value than the second lower limit threshold THV2 set at step S22. Therefore, the second command voltage V2* set at step S23 is set higher than a sum of the first lower limit threshold THV1 and the ripple voltage VRi.

At step S15, the controller 30 operates the first drive switch Q1 to control the link voltage V2r to the second command voltage V2* set at step S14.

The present embodiment described above can provide the following advantages.

(A2) The controller 30 estimates the ripple voltage VRi at the DC link capacitor 15 based on the predicted value EPin of input power from the AC-DC converter 10 to the DC link capacitor 15 and the electrostatic capacitance C of the DC link capacitor 15, where the second command voltage V2* is set higher than a sum of the estimated ripple voltage VRi and the first lower limit threshold THV1. This configuration, even when the ripple voltage occurs at the DC link capacitor 15, can prevent difficulty in supplying the output current from the DC-DC converter 20 to the rechargeable battery 50.

(A3) Use of the predicted value EPin* of input power to the DC link capacitor 15 allows the link voltage V2r to be changed, timed with changes in the first command current I1* and the first command voltage V1*. If an actual measured value of input power is used instead, the link voltage V2r will be changed after the input power supplied from the AC-DC converter 10 to the DC link capacitor 15 has been changed. In such a case, the link voltage V2r may be changed after the link voltage V2r has dropped below the first lower limit threshold THV1 in response to changes in the input power. In the present embodiment where the predicted value EPin* of the input power is used, the link voltage V2r is changed, timed with changes in the first command current I1* and the first command voltage V1*. This configuration allows the second lower limit threshold THV2 to be changed before the link voltage V2r at the DC link capacitor 15 drops below the first lower limit threshold THV1.

Modification to Second Embodiment

A modification to the second embodiment will now be described. The ripple voltage VRi at the DC link capacitor 15 changes with aging degradation of the DC link capacitor 15. In the present modification, the electrostatic capacitance C of the DC link capacitor 15 used to estimate the ripple voltage VRi is updated every predetermined time interval. At step S21, the controller 30 calculates the ripple voltage VRi using the updated electrostatic capacitance C.

Figure 4A:
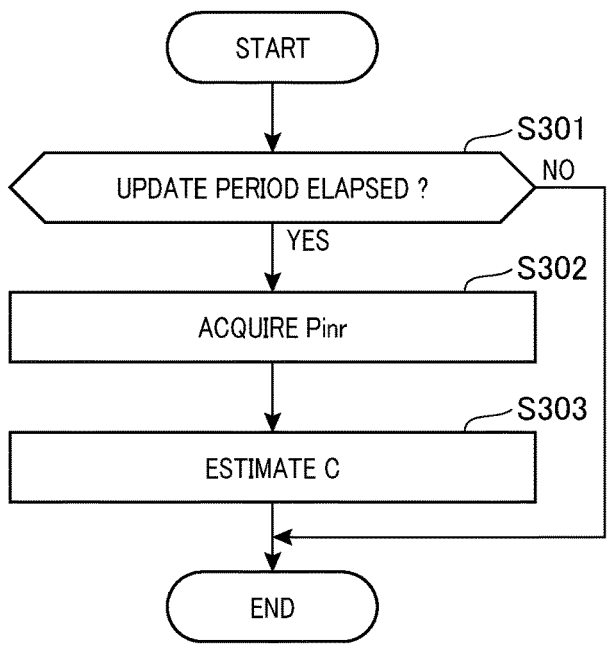
FIG. 4A is a flowchart of processing for estimating electrical capacitance C in accordance with one modification to the second embodiment.

Processing performed by the controller 30 to estimate the electrostatic capacitance C of the DC link capacitor 15 will now be described with reference to FIG. 4A. This processing shown in FIG. 4A is performed iteratively by the controller 30 every predetermined time interval.

At step S301, the controller 30 determines whether or not an update period of the electrostatic capacitance C of the DC link capacitor 15 has elapsed. The update period defines timings of updating the electrostatic capacitance C of the DC link capacitor 15 used to estimate the ripple voltage VRi and may be set to one month or more. If the update period of the electrostatic capacitance C of the DC link capacitor 15 has not yet elapsed, then the process flow of FIG. 4A ends.

At step S302, the controller 30 acquires an actual measured value of the input power to the DC link capacitor 15 as actual measured power Pinr. In the present modification, the controller 30 calculates the actual measured power based on a first current I1r detected by the first current sensor 33 and a first voltage V1r detected by the first voltage detector 31, based on the following expression (4).

$$Pinr = I1r \times V1r \quad (4)$$

Here, Pinr represents the actual measured current.

At step S303, the controller 30 estimates the electrostatic capacitance C of the DC link capacitor 15 from the actual measured power Pinr calculated at step S302. In the present embodiment, the electrostatic capacitance C of the DC link capacitor 15 is calculated based on the following expression (5).

Figure 4B:
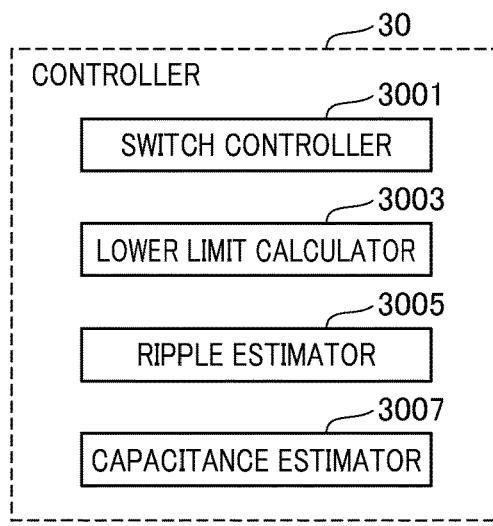
FIG. 4B is a functional block diagram of the controller of the battery charger in accordance with the modification to the second embodiment.

FIG. 4B is a functional block diagram of the controller 30 of the present embodiment. In the present embodiment, as shown in FIG. 4B, the controller 30 further includes a capacitance estimator 3007 as compared to the controller shown in FIG. 3B. The capacitance estimator 3007 is responsible for execution of step S303.

$$C = Pinr/(2\pi f \times V2\text{ave} \times VRir) \quad (5)$$

Here, VRir represents the actual measured value of the ripple voltage VRir. In the present modification, VRir is an absolute value of a maximum value or a minimum value of the link voltage V2r detected by the second voltage detector 32 minus an average of the link voltage V2r.

After execution of step S303, the process flow of FIG. 4A ends. The controller 30, at step S21 of FIG. 3A, estimates the ripple voltage VRi using the electrostatic capacitance C updated in the processing of FIG. 4A.

The present modification to the second embodiment described above can provide the following additional advantage.

(A4) The controller 30 updates the electrostatic capacitance C of the DC link capacitor 15 based on the actual measured value of the ripple voltage VRi at the DC link capacitor 15 every predetermined time interval, and using the updated electrostatic capacitance C, estimates the ripple voltage VRi. This configuration enables accurately estimating changes in the ripple voltage VRi with aging degradation of the DC link capacitor 15, which can prevent difficulty in supplying the output current from the DC-DC converter 20 to the rechargeable battery 50 due to aging degradation of the DC link capacitor 15.

Third Embodiment

A third embodiment will now be described. Only differences of the third embodiment from the second embodiment will be described and description about the common configuration between the present embodiment and the second embodiment is not provided in order to avoid repetition.

When a ripple current flows through the DC link capacitor 15, degradation of the DC link capacitor 15 may be accelerated when the temperature of the DC link capacitor 15 is high as compared to when the temperature of the DC link capacitor 15 is low. Thus, in the third embodiment, the link voltage V2r is set taking into account a temperature condition.

Figure 5:
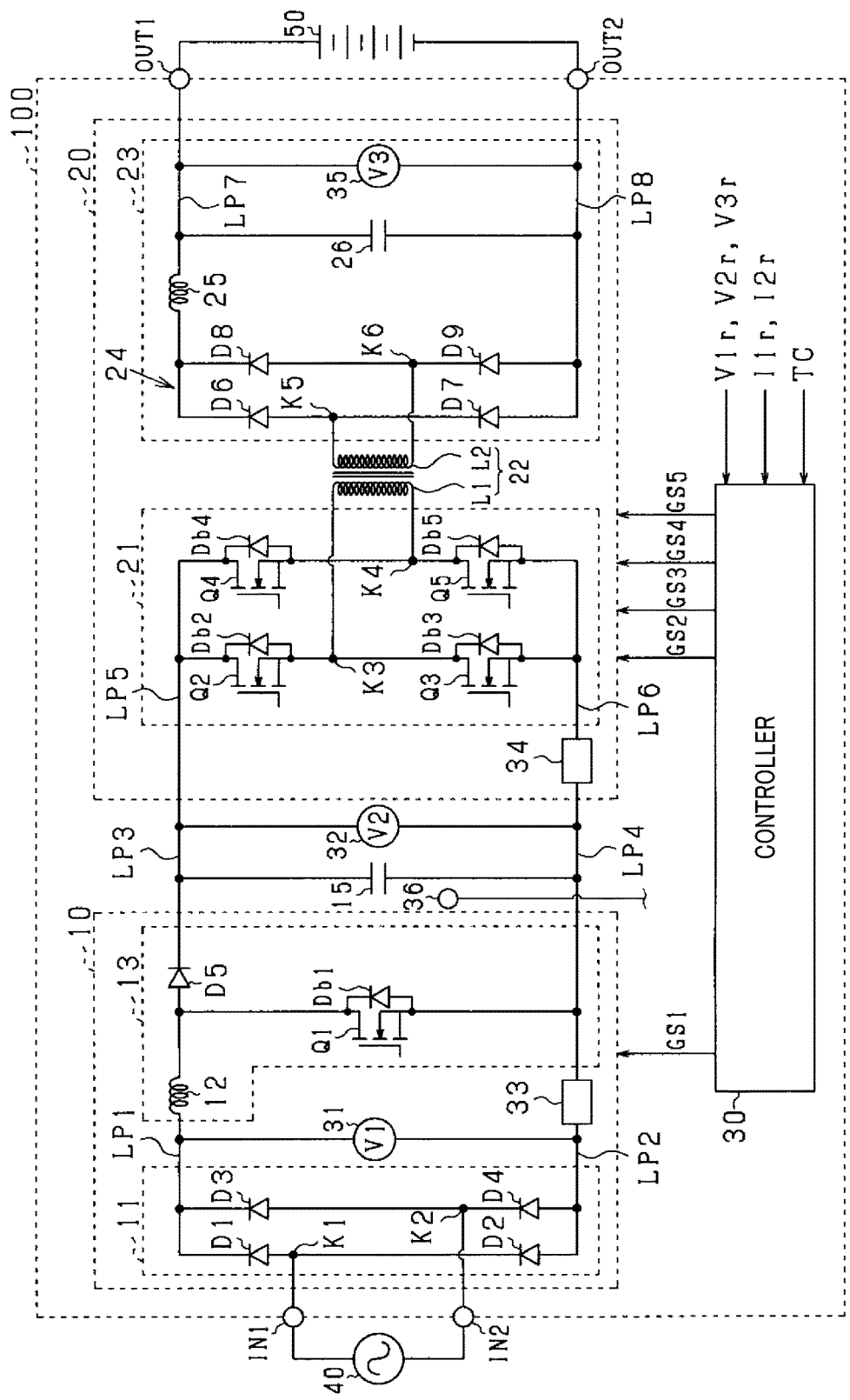
FIG. 5 is a block diagram of a battery charger in accordance with a third embodiment of the present disclosure.

FIG. 5 is a block diagram of the battery charger 100 in accordance with a third embodiment of the present disclosure. In the present embodiment, the battery charger 100 includes a temperature sensor 36 configured to detect a temperature of the DC link capacitor 15. The temperature sensor 36 is disposed proximate to the DC link capacitor 15 to detect an ambient temperature of the DC link capacitor 15 as a capacitor temperature TC. The capacitor temperature TC detected by the temperature sensor 36 is in turn input to the controller 30.

Figure 6A:
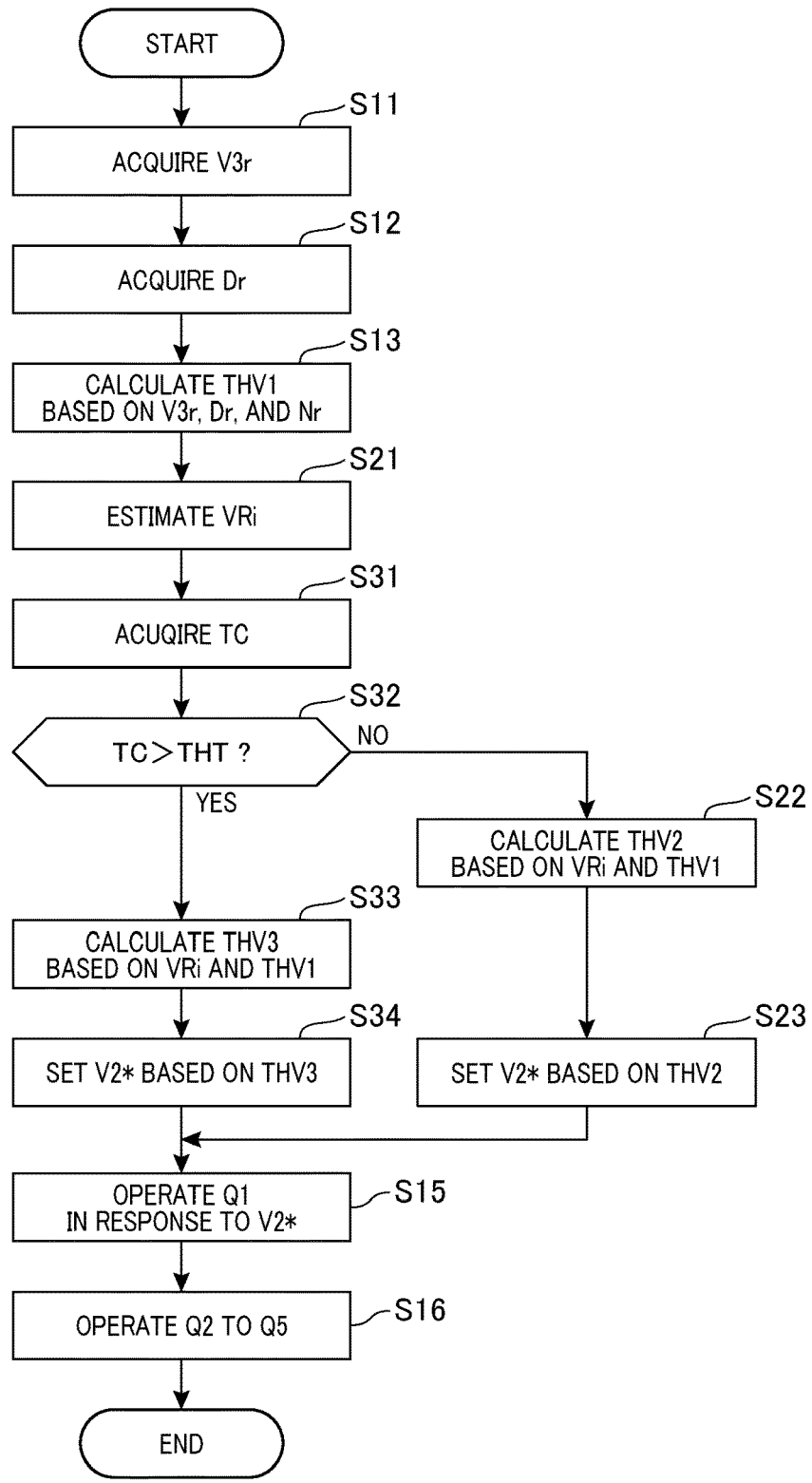
FIG. 6A is a flowchart of processing for controlling the link voltage V$2r$ in accordance with the third embodiment.

FIG. 6A is a flowchart of processing performed by the controller 30 to control the link voltage V2r. This processing is iteratively performed by the controller 30 every predetermined time interval.

After setting the first lower limit threshold THV1 at step S13, the process flow proceeds to step S21. At step S21, the controller 30 estimates the ripple voltage VRi. At step S31, the controller 30 acquires the capacitor temperature TC detected by the temperature sensor 36.

Figure 6B:
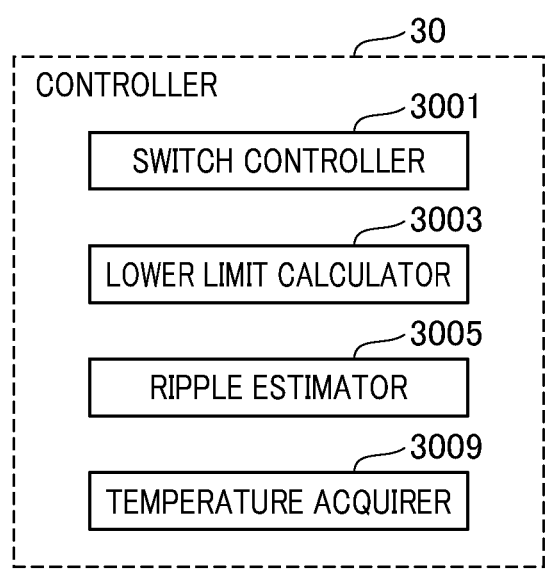
FIG. 6B is a functional block diagram of the controller of the battery charger in accordance with the third embodiment.

FIG. 6B is a functional block diagram of the controller 30 of the present embodiment. In the present embodiment, as shown in FIG. 6B, the controller 30 further includes a temperature acquirer 3009 as compared to the controller shown in FIG. 3B. The temperature acquirer 3009 is responsible for execution of step S31.

At step S32, the controller 30 determines whether or not the capacitor temperature TC acquired at step S31 is higher than a temperature threshold THT. For example, the temperature threshold THT may be a lower limit of temperature, at or below which degradation of the DC link capacitor 15 is likely to be accelerated as the ripple current flows.

If the capacitor temperature TC is higher than the temperature threshold THT, then the process flow proceeds to step S33. At step S33, the controller 30 calculates a third lower limit threshold THV3 based on the ripple voltage VRi estimated at step S21 and the first lower limit threshold THV1 calculated at step S13. The third lower limit threshold THV3 is a higher value than the second lower limit threshold THV2. Based on the expression (2), the ripple voltage VRi decreases with increasing average V2ave of the link voltage V2r. Therefore, in the present embodiment, to reduce the ripple voltage VRi, the lower limit of the link voltage V2r is set to the third lower limit threshold THV3 above the second lower limit threshold THV2.

At step S34, the controller 30 sets the second command voltage V2* to a higher value than the third lower limit threshold THV3.

If at step S32 it is determined that the capacitor temperature TC is equal to or lower than the temperature threshold THT, the process flow proceeds to step S22. In such a case, even if the ripple current flow through the DC link capacitor 15, degradation of the DC link capacitor 15 is less likely to be accelerated. Thus, in order to prioritize reduction of the switching losses, the controller 30 calculates the second lower limit threshold THV2 based on the ripple voltage VRi estimated at step S21 and the first lower limit threshold THV1 calculated at step S13. The second lower limit threshold THV2 is a lower value than the third lower limit threshold THV3.

At step S23, the controller 30 sets the second command voltage V2* to a higher value than the second lower limit threshold THV2. In the present embodiment, the second command voltage V2* is set higher than the second lower limit threshold THV2 and lower than the third lower limit threshold THV3.

At step S15, the controller 30 operates the first drive switch Q1 to control the link voltage V2r to the second command voltage V2*.

The present embodiment described above can provide the following additional advantage.

(A5) The controller 30 is configured to, if determining that the capacitor temperature TC indicative of the temperature of the DC link capacitor 15 is higher than the temperature threshold THT, set the second command voltage V2* to a higher value than the third lower limit threshold THV3, and if determining that the capacitor temperature TC is equal to or lower than the temperature threshold THT, set the second command voltage V2* to a value that is higher than the second lower limit threshold THV2 and lower than the third lower limit threshold THV3. This configuration can prevent degradation of the DC link capacitor 15. In addition, if and only if the capacitor temperature TC falls within a temperature range in which the degradation of the DC is likely to be accelerated, the link voltage V2r is set higher than the third lower limit threshold THV3, which can perform better at reducing the switching losses of the battery charger 100 as compared to cases where the second command voltage V2* is unconditionally set higher than the third lower limit threshold THV3.

Fourth Embodiment

A fourth embodiment will now be described. Only differences of the fourth embodiment from the first embodiment will be described and description about the common configuration between the first and fourth embodiments is not provided in order to avoid repetition.

In the present embodiment, the controller 30 performs well-known peak current mode to control current through each of the second to fifth drive switches Q2-Q5 of the DC-DC converter 20 to a command current IL*.

Figure 7:
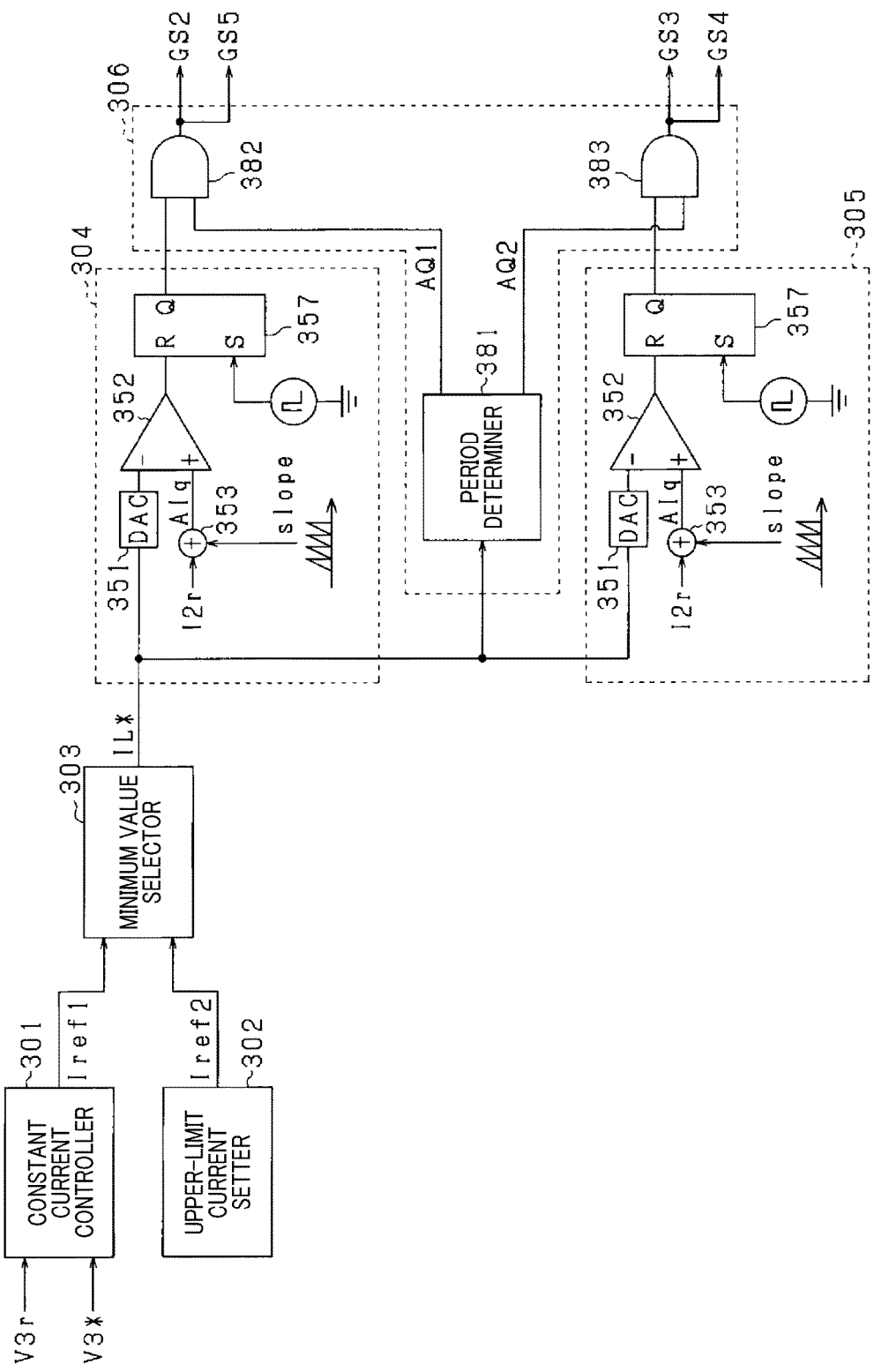
FIG. 7 is an illustration of a peak current mode control function of a controller in accordance with a fourth embodiment of the present disclosure.

Referring to FIG. 7, a function of the controller 30 to calculate the command current IL* used to perform the peak current mode control will now be described. The controller 30 includes a constant current controller 301, an upper-limit current setter 302, a minimum value selector 303, a first current controller 304, a second current controller 305, and a switch controller 306.

The constant current controller 301 performs constant current control to feedback control the output voltage V3r to the third command voltage V3*. In the present embodiment, the constant current controller 301 calculates a target current value Iref1 that is a target value of the output current of the DC-DC converter 20, as a control variable used to control the output voltage V3r to the third command voltage V3*.

The upper-limit current setter 302 sets an upper-limit current value Iref2 in response to a rated current of the DC-DC converter 20. For example, the upper-limit current value Iref2 may be set taking into account the turns ratio Nr of the transformer 22 and the current through the second reactor 25.

The minimum value selector 303 compares the target current value Iref1 output from the constant current controller 301 and the upper-limit current value Iref2 output from the upper-limit current setter 302 and outputs a smaller one of them as a command current IL*.

The first current controller 304 includes a digital to analog (DA) converter (DAC) 351, a comparator 352, an adder 353, and an RS flip-flop 357. The command current IL* is input to the DA converter 351. The DA converter 351 converts the command current IL* from a digital value to an analog value. The command current IL*, after being converted to an analog value by the DA converter 351, is input to an inverting input terminal of the comparator 352. The adder 353 calculates a sum of the second current I2r detected by the second current sensor 34 and a slope compensation signal Slope and outputs the sum as an after-compensation reactor current AIq. The output from the adder 353 is input to a non-inverting input terminal of the comparator 352. The slope compensation signal Slope is added to suppress oscillation caused by variations in the current through the first reactor 12.

The comparator 352 compares the command current IL* and the after-compensation reactor current AIq. During a period of time where the after-compensation reactor current AIq is less than the command current IL*, the comparator 352 inputs a low-state signal to an R terminal of the RS flip-flop 357. During a period of time where the after-compensation reactor current AIq is greater than the command current IL*, the comparator 352 inputs a high-state signal to the R terminal of the RS flip-flop 357. A clock signal is input to an S terminal of the RS flip-flop 357.

Like the first current controller 304, the second current controller 305 includes a DA converter 351, a comparator 352, an adder 353, and an RS flip-flop 357.

The switch controller 306 switches between outputting the second and fifth operation signals GS2, GS5 to the second and fifth drive switches Q2, Q5 and outputting the third and fourth drive switches Q3, Q4 to the third and fourth operation signals GS3, GS4. The switch controller 306 includes a period determiner 381, a first AND circuit 382, and a second AND circuit 383.

The period determiner 381, when determining that the current period is the turn-on period for the second and fifth drive switches Q2, Q5, outputs a high-state first selection signal AQ1 to output the second and fifth operation signals GS2, GS5 to gates of the second and fifth drive switches Q2, Q5. The period determiner 381, when determining that the current period is the turn-on period for the third and fourth drive switches Q3, Q4, outputs a high-state second selection signal AQ2 to output the third and fourth operation signals GS3, GS4 to gates of the third and fourth drive switches Q3, Q4.

An output signal of the RS flip-flop 357 of the first current controller 304 and the first selection signal AQ1 output from the period determiner 381 are input to the first AND circuit 382. An output of the first AND circuit 382 is electrically connected to the gate of the first drive switch Q1. An output signal of the RS flip-flop 357 of the second current controller 305 and the second selection signal AQ2 output from the period determiner 381 are input to the second AND circuit 383. An output of the second AND circuit 383 is electrically connected to the gate of the second AND circuit 383.

Upon receipt of the high-state first selection signal AQ1 and the high-state output signal of the RS flip-flop 357, the first AND circuit 382 outputs the high-state second operation signal GS2 and the high-state fifth operation signal GS5, which causes the second and fifth drive switches Q2, Q5 to be turned on. Upon receipt of the high-state second selection signal AQ2 and the high-state output signal of the RS flip-flop 357, the second AND circuit 383 outputs the high-state third operation signal GS3 and the high-state fourth operation signal GS4, which causes the third and fourth drive switches Q3, Q4 to be turned on.

Figure 8:
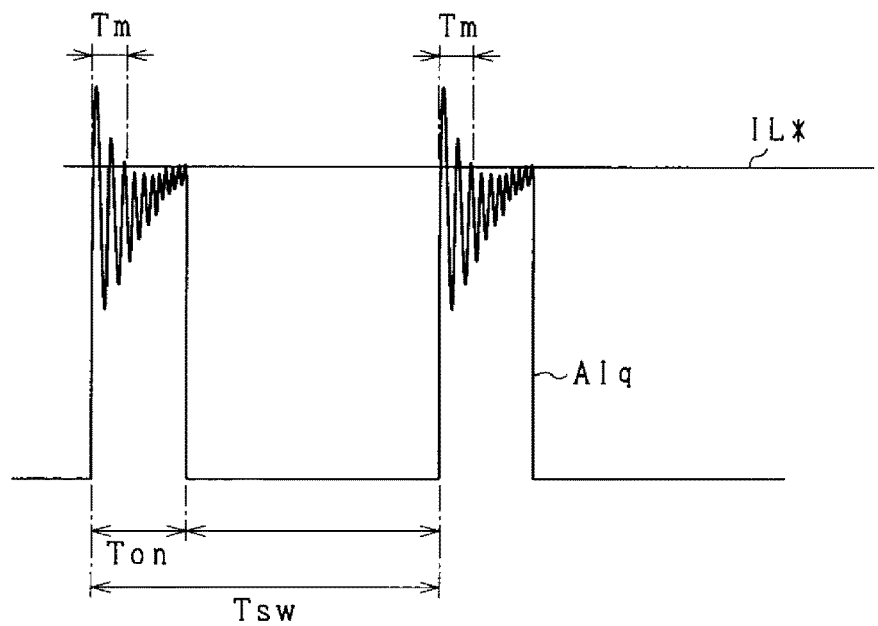
FIG. 8 is an illustration of ringing in a comparative example.

During a certain period of time after each of the second to fifth drive switches Q2-Q5 is turned on, ringing may occur such that the current through each of the second to fifth drive switches Q2-Q5 varies. FIG. 8 illustrates a comparative example of such ringing. If the duty ratio of the turn-on period Ton for each of the second to fifth drive switches Q2-Q5 is low, ringing may not have yet converged at a point in time when the after-compensation reactor current AIq, i.e., the slope-compensated second current I2r, has risen to the command current IL*. In addition, ringing may not have yet converged even after a mask period Tm set within and from the beginning of the turn-on period Ton (see FIG. 8), in which detecting the after-compensation reactor current AIq is withheld, has elapsed. In such a case, the after-compensation reactor current AIq may move above and below the command current IL* for a short period, which may disable stably operating the second to fifth drive switches Q2-Q5.

The turn-on period Ton for each of the second to fifth drive switches Q2-Q5 decreases as the link voltage V2r that is the input voltage to the DC-DC converter 20 is increased. In addition, an increase rate of the second current I2r increases as the link voltage V2r is increased. The higher the link voltage V2r becomes, the shorter the turn-on period Ton becomes. Thus, as shown in FIG. 8, it is more likely that ringing does not converge before the after-compensation reactor current AIq reaches the command current IL*.

Figure 9:
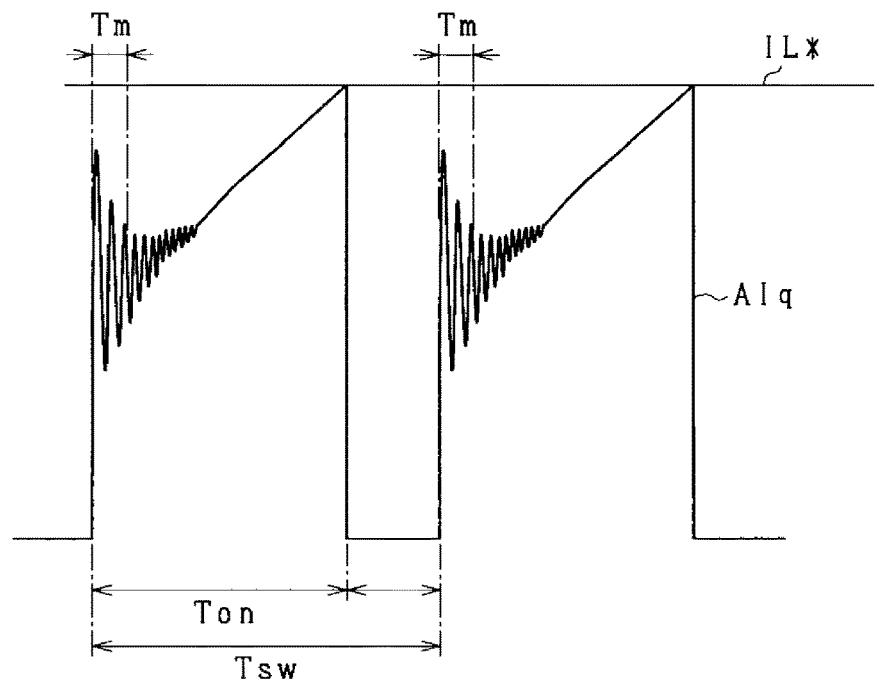
FIG. 9 is an example of an after-compensation reactor current AIq used in processing in accordance with the fourth embodiment.

In the present embodiment, the upper limit of the link voltage V2r is set such that ringing can converge before the after-compensation reactor current AIq rises to the command current IL*. FIG. 9 illustrates an example of a waveform of the after-compensation reactor current AIq of the present embodiment.

As above, the upper limit of the link voltage V2r is set, resulting in an increased time required for the after-compensation reactor current AIq to rise to the command current IL* and an increased turn-on period Ton as compared to the comparative example shown in FIG. 8. In addition, the increase rate of the after-compensation reactor current AIq is also decreased. As a result, it becomes more likely that ringing converges before the after-compensation reactor current Aiq rises to the command current IL*.

Figure 10A:
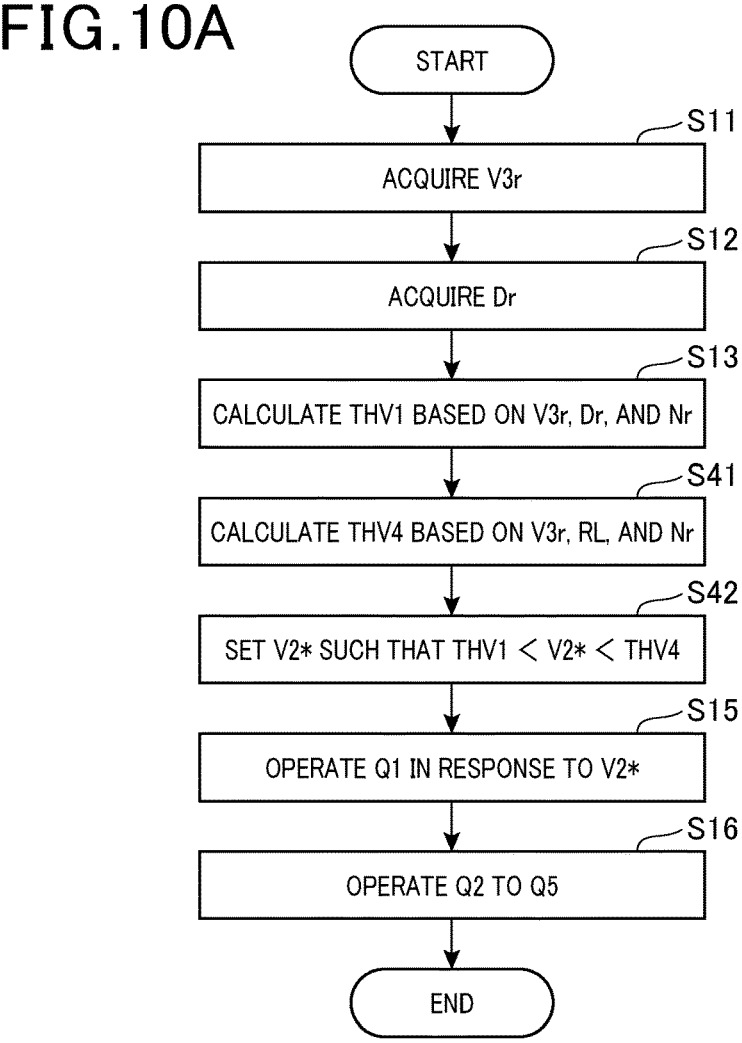
FIG. 10A is a flowchart of processing for controlling the link voltage V2r in accordance with the fourth embodiment.

FIG. 10A is a flowchart of processing performed by the controller 30 to control the link voltage V2r. This processing is iteratively performed by the controller 30 every predetermined time interval.

After calculating the first lower limit threshold THV1 at step S13, the process flow proceeds to step S41. At step S41, the controller 30 calculates the upper-limit threshold THV4 that is an upper limit of the link voltage V2r. In the present embodiment, the upper-limit threshold THV4 is calculated using the following expression (6).

Figure 10B:
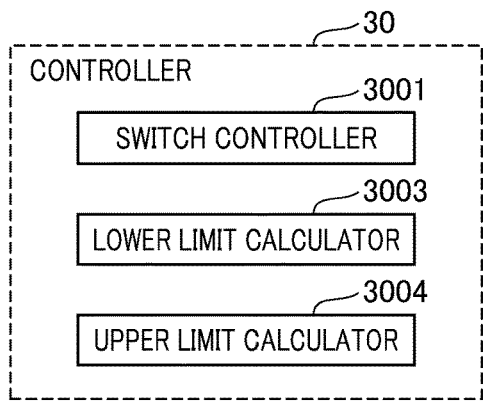
FIG. 10B is a functional block diagram of the controller of the battery charger in accordance with the fourth embodiment.

FIG. 10B is a functional block diagram of the controller 30 of the present embodiment. In the present embodiment, as shown in FIG. 10B, the controller 30 further includes an upper limit calculator 3004 as compared to the controller shown in FIG. 2B. The upper limit calculator 3004 is responsible for execution of step S41.

$$THV4 = V3r/RL \times Nr \quad (6)$$

Here, RL represents a ratio of a period of time Te to one switching period Tsw1 (=Te/Tsw1) for each of the second to fifth drive switches Q2-Q5. Te is a duration of ringing that is a period of time from the beginning of the turn-on period Ton to convergence of ringing. For example, the ratio RL may be a maximum one of actual measured values of the duration of ringing within the turn-on period Ton for the second to fifth drive switches Q2-Q5.

At step S42, the controller 30 sets the second command voltage V2* for the DC-DC converter 20 to a value between the first lower limit threshold THV1 set at step S13 and the upper-limit threshold THV4 set at step S41.

At step S15, the controller 30 operates the first drive switch Q1 of the AC-DC converter 10 to control the link voltage V2r to the second command voltage V2*.

The present embodiment described above can provide the following advantage.

(A6) The controller 30 calculates the upper-limit threshold THV4 of the link voltage V2r based on the output voltage V3r of the DC-DC converter 20, the turns ratio Nr, the ratio RL of the duration of ringing to one switching period Tsw1 for the second to fifth drive switches Q2-Q5.

The controller 30 operates the first drive switch Q1 of the AC-DC converter 10 to control the link voltage V2r to a value higher than the first lower limit threshold THV1 and lower than the upper-limit threshold THV4, which can facilitate ringing converging before the after-compensation reactor current AIq through each of the second to fifth drive switches Q2-Q5 reaches the command current IL*. This can suppress variations in the output voltage V3r caused by ringing and implement stable supply of the output current to the rechargeable battery 50.

Modifications (M1) In an alternative embodiment to each of the first to fourth embodiments, instead of using the duty ratio of the turn-on period Ton to calculate the first lower limit threshold THV1 at step S13, a value other than the maximum duty ratio Dr may be used. For example, an average of the duty ratio of the turn-on period Ton may be used to calculate the first lower limit threshold THV1.

(M2) In an alternative embodiment to each of the first to fourth embodiments, the boost chopper circuit 13 of the AC-DC converter 10 may include two or more drive switches.

(M3) In an alternative embodiment to each of the first to fourth embodiments, an actual measured value of the ripple voltage may be used to set the second lower limit threshold THV2.

What is claimed is:

1. An apparatus for controlling a power converter, the power converter comprising:
a first converter configured to convert an AC voltage supplied from an alternating current (AC) power source into a direct-current (DC) voltage by operations of an input side switch;
a DC link capacitor configured to be charged with the DC voltage supplied from the first converter;
a second converter comprising a primary side circuit including one or more output side switches, a secondary side circuit electrically connected to an object to be powered, and a transformer isolating the primary side circuit and the secondary side circuit from each other, the second converter being configured to step down the DC voltage supplied from the DC link capacitor by operations of the one or more output side switches and supply the stepped down voltage to the object to be powered; and
a voltage detector configured to detect an output voltage of the second converter,
wherein the apparatus comprises:
a lower limit calculator configured to calculate a lower limit of a voltage across the DC link capacitor based on an output voltage detected by the voltage detector, a turns ratio of the transformer, and a ratio of a turn-on period to one switching period for the one or more output side switches; and
a switch controller configured to operate the input side switch to control a link voltage that is a voltage across the DC link capacitor to a command voltage higher than the lower limit.

2. The apparatus according to claim 1, wherein
the lower limit calculator is configured to calculate the output voltage of the second converter multiplied by the turns ratio of the transformer and divided by a maximum ratio of the turn-on period to one switching period for the one or more output side switches, as the lower limit of the voltage across the DC link capacitor.

3. The apparatus according to claim 1, further comprising
a ripple estimator configured to estimate a ripple voltage at the DC link capacitor based on a predicted value of input power to the DC link capacitor and the electrostatic capacitance of the DC link capacitor,
wherein the switch controller is configured to set the command voltage to a higher value than a sum of the estimated ripple voltage and the lower limit.

4. The apparatus according to claim 3, further comprising
a capacitance estimator configured to estimate the electrostatic capacitance of the DC link capacitor based on an actual measured value of the ripple voltage at the DC link capacitor,
wherein the ripple estimator is configured to estimate the ripple voltage at the DC link capacitor using the electrostatic capacitance of the DC link capacitor estimated by the capacitance estimator.

5. The apparatus according to claim 1, further comprising
a temperature acquirer configured to acquire a temperature of the DC link capacitor,
wherein the lower limit calculator is configured to, if determining that the temperature of the DC link capacitor is higher than a predetermined temperature threshold, calculate the lower limit to a higher value than if it is determined that the temperature of the DC link capacitor is equal to or lower than the predetermined temperature.

6. The apparatus according to claim 1, further comprising
an upper limit calculator configured to calculate an upper limit of the link voltage based on the output voltage of the second converter, the turns ratio of the transformer, and a ratio of a duration of ringing in current through the one or more output side switches to one switching period for the one or more output side switches,
wherein the controller is configured to operate the one or more output side switches to peak current mode control the current through the one or more output side switches, and
the controller is configured to operate the input side switch of the first converter to control the link voltage to a value that is higher than the lower limit and lower than the upper limit.

7. The apparatus according to claim 1, wherein
the primary side circuit comprises a first series connection of a pair of output side switches and a second series connection of a pair of output side switches, the first and second series connections being electrically connected in parallel with each other,
a connection point between the pair of output side switches forming the first series connection is electrically connected to a first end of the primary side winding of the transformer,
a connection point between the pair of output side switches forming the second series connection is electrically connected to a second end of the primary side winding of the transformer, and
the object to be powered is electrically connected between both ends of the secondary side circuit that is magnetically coupled to the primary side winding through the secondary side winding.

* * * * *